United States Patent [19]

Kotzur

[11] 4,371,173

[45] Feb. 1, 1983

[54] FLUID-LOCKED SHAFT SEAL OF REDUCED SLIDING SPEED

[75] Inventor: Joachim Kotzur, Oberhausen, Fed. Rep. of Germany

[73] Assignee: M.A.N. Maschinenfabrik Augsburg-Nürnberg Aktiengesellschaft, Oberhausen, Fed. Rep. of Germany

[21] Appl. No.: 366,299

[22] Filed: Apr. 7, 1982

[30] Foreign Application Priority Data

Apr. 28, 1981 [DE] Fed. Rep. of Germany ....... 3116762

[51] Int. Cl.[3] .................. F16J 15/36; F16J 15/38; F01D 11/00; F04D 29/12
[52] U.S. Cl. ........................................ 277/12; 277/83; 277/88; 277/93 R; 277/134; 277/176; 415/109; 415/175
[58] Field of Search ............... 277/12, 32, 81 R, 82, 277/83, 85, 88, 89, 93 R, 93 SD, 133, 134, 173, 176; 415/109, 175, 176

[56] References Cited

U.S. PATENT DOCUMENTS

| | | | |
|---|---|---|---|
| 2,727,765 | 12/1955 | Kilpatrick | 277/83 |
| 2,819,101 | 1/1958 | Luenberger | 277/83 |
| 2,875,696 | 3/1959 | von Zborowski | 415/109 X |
| 3,068,801 | 12/1962 | Murray | 415/109 |
| 3,395,645 | 8/1968 | Vilet | 415/175 X |
| 3,402,671 | 9/1968 | Wilfley et al. | 415/109 X |
| 3,632,120 | 1/1972 | Brandt | 277/83 |

*Primary Examiner*—Robert S. Ward, Jr.
*Attorney, Agent, or Firm*—McGlew and Tuttle

[57] ABSTRACT

A fluid-locked shaft seal comprises a housing with a shaft rotating therein having a seal ring affixed thereto for rotation therewith. A packing ring is disposed in the housing around the shaft and is fixed radially in respect to the shaft but is held by flexible means which permits its axial movement to some extent. A slide ring in the housing around the shaft is located between the seal ring and the packing ring and connected to the shaft for rotation that is substantially half the speed of rotation of the shaft. A pump rotor is formed with the seal and disposed on the side of the seal ring which is adjacent to the slide ring and generates a fluid flow in a deflecting channel which is defined in the housing by slide ring and the seal ring. A plurality of stationary impellers are disposed in the deflection channel and the slide ring has a turbine portion disposed in this channel. On the seal ring side the housing forms with the seal ring a sealing gap which communicates through a sealing oil chamber to a portion of the shaft having a floating ring. At the opposite end, that is on the slide ring side, is a sealing chamber disposed adjacent the packing ring. The packing ring is held to the housing by a flexible bellows.

6 Claims, 9 Drawing Figures

FLUID-LOCKED SHAFT SEAL OF REDUCED SLIDING SPEED

FIELD AND BACKGROUND OF THE INVENTION

This invention relates in general to rotating seals and in particular to a new and useful shaft seal.

The invention relates particularly to a fluid-locked shaft seal having a seal ring which rotates with the shaft and is provided with flow channels, a fixed packing ring adapted for flexible axial movement and sealingly connected with the housing, and a slide ring which is arranged between the rotating seal ring and the fixed packing ring and rotates at approximately half the speed of rotation of the shaft.

Shaft seals of the above named kind are used for packing between the rotating shaft and the housing of fluid energy machines for the compression and expansion of gases.

In the shaft seal according to British Pat. No. 1,269,285, it is provided to generate in the seal ring revolving at the shaft speed, in radial channels arranged therein and by pumping action, a flow of the cooling oil which is deflected in axial directions, conveyed through axial bores in the slide ring and returned into the oil cycle through further bores in stationary parts. The slide ring is to revolve approximately at half the speed of the shaft. Measures required for this have not been disclosed.

The speed of rotation of the freely rotating slide ring is determined by the torques acting on it. The latter are determined essentially by the friction moments generated at the two end faces.

In the sliding ring seal here considered, the coefficient of friction depends little on the speed of rotation, so that the drive moment $M_I$ transmitted from the rotating seal ring to the sliding ring by friction is generally smaller at all speeds $n_G$ of the sliding ring than the braking moment. The braking moment consists of the friction moment between sliding ring and non-rotating packing ring $M_{II}$ and that of the wall friction $M_M$ of the sliding ring (externally in liquid, internally in gas), which increases with increasing speed (FIG. 7 and 8). Through different diameters and coefficients of friction of the two axial slide surfaces of the sliding ring, variations of the sketched curve forms are possible within limits, but the uncertainty of the definition of a unique operational speed of rotation $n_G^*$ of the sliding ring remains.

The liquid stream issuing with twist out of the seal ring 2 rotating at full speed causes no turbine torque in the freely rotating sliding ring 12 at shockfree inflow to the axial bores 19, since then the velocity triangles at the entrance and exit of these bores are the same.

If the inflow in the relative system is not shockfree, a torque may be exerted, although it is questionable what effect this will still have due to the flow losses at the sliding ring 12 caused by this faulty approach flow and whereby one half the speed of rotation of the sliding ring 12 relative to the shaft is to be brought about. Evidently the sliding ring 12 is not conceived as a turbine wheel.

If the sliding ring does not rotate or does so only at a low, not clearly defined speed, the now maximum relative sliding velocity between rotating seal ring and sliding ring generates locally a considerable friction heat. An adverse effect, especially at high speeds of rotation, is that of the additional flow losses caused by the faulty approach with regard to an additional temperature increase, which must be avoided. Further flow losses occur due to the fact that through the shown flow conduction after issuance from the sliding ring an extensive whirling of the flow velocity (sic) issuing from the sliding ring is brought about, so that further losses come about through the required transformation of static pressure energy into velocity at the entrance to the pump wheel.

Such a shaft seal is suitable, therefore, for low to medium sliding velocities. At high sliding velocities overheating may occur due to insufficient removal of heat, leading to premature wear of the sliding ring. A torque, unambiguously definable for the speed of the freely rotating sliding ring at smallest possible flow losses is not obtainable thereby.

SUMMARY OF THE INVENTION

The invention provides in the region of the shaft seal, improved flow conditions which insure that the sliding ring is driven by a torque produced by the flow energy; and, at an unambiguously defined speed of rotation at the friction surfaces of the sliding ring only a minimum friction heat results, which is securely removed by the oil stream.

According to the invention a seal ring rotating with the shaft is equipped on its side toward the sliding ring with a pump rotor generating a directed flow, which rotor guides the cooling and locking medium into a deflection channel in the housing, in which are contained one or more stationary impellers, and the sliding ring is provided with a turbine wheel.

The cooling medium used for lubrication and removal of the friction heat, preferably oil, is introduced into the housing under a pressure slightly increased relative to the medium to be sealed and completely fills the packing space.

The pump rotor, which is integrated into the seal ring rotating at the speed of rotation of the machine, sets the oil in motion, so that in the deflection channel in the housing, in at least one stationary impeller, a directed flow results, with which the turbine wheel associated with the sliding ring is admitted. In the turbine wheel the flow energy is transformed into a torque which sets the sliding ring into rotation. The issuing oil stream is sucked up again by the pump rotor on the shortest path and without swirling of its kinetic energy, so that a closed cycle is formed.

By the turbine wheel driving the sliding ring there is produced in addition to the drive-friction moment $M_I$ a supplementary moment $M_T$, which has a tendency decreasing with increasing speed of rotation $n_G$ of the sliding ring (always considered at constant shaft speed $n_W$). The wall friction moment $M_M$ has a tendency rising with the speed of rotation $n_G$.

It is thus possible to establish a speed of rotation $n_G^*$ of the sliding ring at which the torques $(M_I + M_T)$ transmitted to the sliding ring are equal to the braking torque $(M_{II} + M_M)$ (FIG. 6). Differences in the moments $M_I$ and $M_{II}$ caused by possible changes of the coefficients of friction become the more insignificant as the turbine torque and wall friction moment are higher, which can be controlled by the layout of the turbine wheel and pump rotor as well as of the wall friction (surface, form).

3

A unique position is given to the sliding ring provided with a turbine wheel by the fact that it is guided radially in a sliding bearing.

The advantage of the shaft seal according to the invention comprises the combination of pump rotor, impeller and turbine wheel, whose dimensions and respective angles are matched in such a way that for the sliding ring one half the shaft speed reliably adjusts itself and there results an identical relative sliding velocity both to the revolving seal ring and to the housingside stationary packing ring.

Apart from the friction losses at the walls, the flow-correct circulation of the cooling oil causes no energy loss by swirling.

Besides, the oil stream forced through the turbine wheel and pump rotor causes an intensive removal of the friction heat developed at the seal surfaces, owing to which the safety of operation and the life of the shaft seal are considerably improved.

Accordingly, it is an object of the invention to provide a fluid-locked shaft seal which comprises a housing with a rotating shaft therein having a seal ring affixed thereto for rotation therewith and with a fixed packing ring fixed radially in respect to the shaft and held by flexible means for some axial displacement, further including a slide ring in the housing around the shaft between the seal ring and the packing and connected to the shaft for rotation at substantially half the speed of rotation of the shaft, the seal ring having a pump rotor portion generating a fluid flow on the side adjacent the slide ring and the slide ring having a turbine wheel disposed in the space between it and the associated seal ring which defines a deflection channel.

A further object of the invention is to provide a fluid-locked shaft seal which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
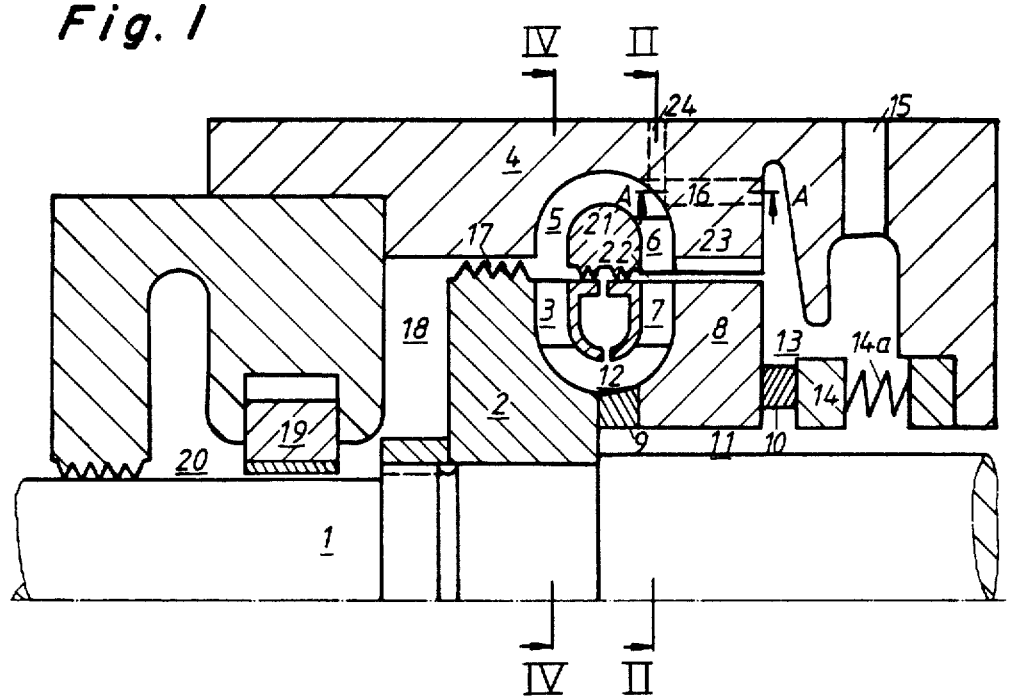
FIG. 1 is a partial longitudinal sectional view of a fluid locked shaft seal constructed in accordance with the invention.

Referring to the drawings in particular the invention embodied therein comprises a fluid-locked shaft seal which comprises a housing 4 having a shaft 1 rotating therein and carrying a seal ring 2 which is affixed to the shaft for rotation therewith. A packing ring 14 is disposed in the housing around the shaft 1 and fixed radially in respect to the shaft and is held by flexible means such as a bellows 14a to permit flexible axial movement to some degree. A slide ring 8 is disposed in the housing around the shaft 1 between the seal ring 2 and the packing ring 14. The slide ring 8 is connected to the shaft 1 for rotation therewith at a speed which is substantially half the speed of rotation of the shaft.

In accordance with a feature of the invention a pump rotor 3 is formed with the seal ring 2 and is disposed on its side adjacent the slide ring 8 to generate a fluid flow in a deflection channel 5 which is defined in the housing between the seal ring 2 and the slide ring 8. A plurality of stationary impellers 6 are also disposed in the deflection channel 5. In addition the slide ring 8 is provided with a turbine wheel 7 which is disposed in the channel 5.

On shaft 1 is arranged the seal ring 2 which rotates at the machine speed $n_W$ and into which the pump rotor 3 is integrated. With this pump rotor 3 a liquid (here oil) disposed in a deflection channel 5 of a housing 4, is supplied via the turbine impeller 6 to the turbine wheel 7. The wheel 7 is integrated into a sliding ring 8, which contains also two seal rings 9 and 10 (here carbon) which seal off a process gas chamber 11 of the respective fluid energy machine against the sealing oil in the chambers 12 and 13. This is done, one one side, against the seal ring 2 rotating with the shaft and, on the other side, against the non-rotating packing ring 14 which is flexibly axially movable and connected sealingly with the housing. The sliding ring 8 with its associated seal rings 9 and 10 are dimensioned so that its axial thrust remains within the permissible range.

Figure 1A:
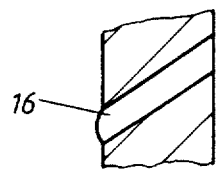
FIG. 1a is a section taken along the line A—A of FIG. 1.

Sealing oil enters chamber 13 through bore 15 at slight positive pressure and flows thence through bores 16 into the deflection channel 5. Viewed in circumferential direction, the bores 16 are inclined so that the steaming oil flows into the deflection channel 5 without any great change of direction (FIG. 1a).

Via an additional external connection 24, additional cooling oil can, if necessary, be conveyed into the pump-turbine cycle for exchange.

A part of the oil streaming into the chamber 13 passes directly into chamber 22 via a sliding bearing 23.

Figure 2:
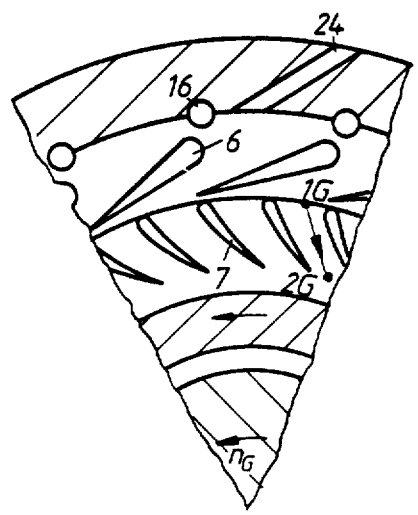
FIG. 2 is a partial transverse section through the turbine impeller and rotor of FIG. 1.

FIG. 2 shows that the turbine impeller 6 is integrated into the deflection channel 5. The oil stream enters the turbine wheel at the absolute velocity $c_{1G}$ generated in the turbine impeller 6.

Figure 3:
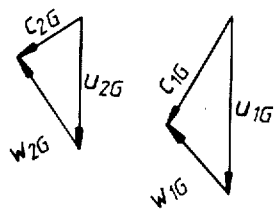
FIG. 3 is velocity triangle diagram at the entrance and exit of the turbine wheel.

With the circumferential speed at the outside diameter $u_{1G}$ there results the relative entrance velocity $w_{1G}$, which determines the outer blade angle of the turbine wheel 7. At the inside diameter of the turbine wheel 7 the oil stream flows out at the relative velocity $w_{2G}$, resulting at the circumferential speed $u_{2G}$ in the absolute exit velocity $c_{2G}$ (FIG. 3). From the variation of the circumferential components of the absolute velocities $c_{1G}$ and $c_{2G}$ as well as of the circumferential speeds $u_{1G}$ and $u_{2G}$ there results the torque $M_T$ generated by the turbine wheel 7.

Figure 4:
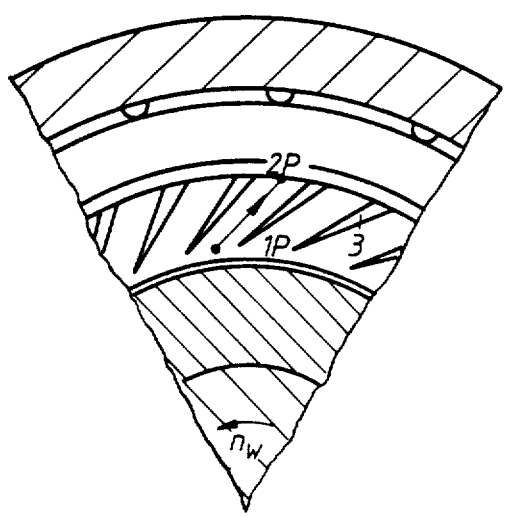
FIG. 4 is a transverse section through the pump rotor of the showing in FIG. 1.

To the pump rotor 3 shown in transverse section in FIG. 4 the oil is supplied at an absolute entrance velocity $c_{1p}$ which, at the dimensions shown in FIG. 4, is approximately equal in magnitude and direction to the absolute exit velocity $c_{2G}$ of the turbine.

To preferably half the speed of rotation of the sliding ring $n_G$, of the turbine wheel, as against the speed of rotation of the shaft $n_W$, of the pump rotor, there corresponds at the dimensions shown in FIG. 3 a circumferential speed $u_{1p}$ which is about twice as great at $u_{2G}$. With $c_{1p}$ and $u_{1p}$ there results the relative entrance velocity $w_{1p}$, which determines the inner blade angle of the pump rotor 3.

Figure 5:
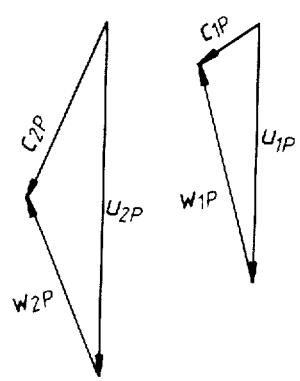
FIG. 5 is a velocity triangle diagram for the entrance and exit of the pump rotor.
Figure 6:
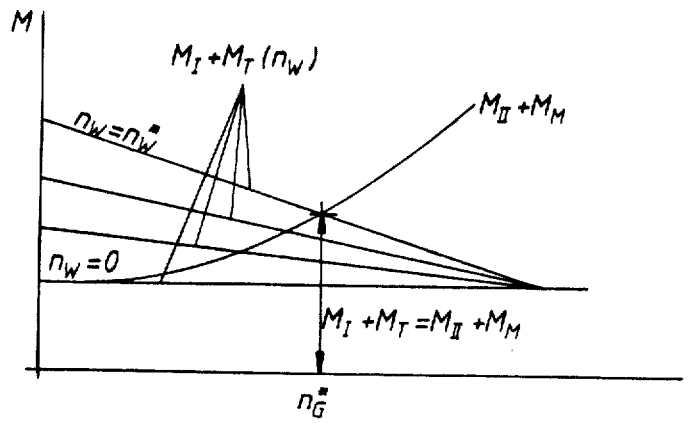
FIG. 6 is a diagram showing the variation of torque at the sliding ring as a function of its speed of rotation.
Figure 7:
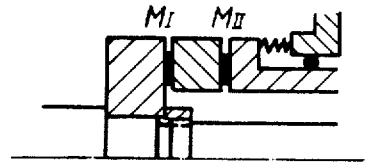
FIG. 7 is a longitudinal sectional view through a known shaft seal wall construction.
Figure 8:
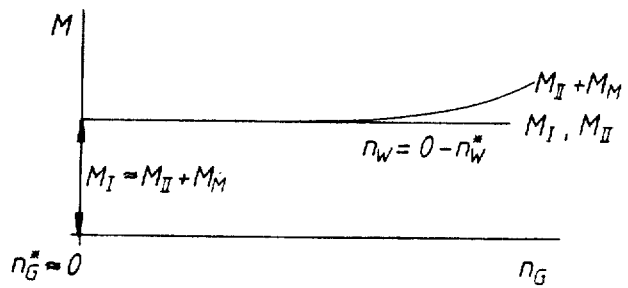
FIG. 8 is a curve indicating the variation of torque relating to the construction shown in FIG. 7.

At the exit the oil stream leaves the pump rotor 3 at the relative velocity $w_{2p}$, resulting at the circumferential speed $u_{2p}$ in the absolute exit velocity $c_{2p}$ (FIG. 5).

The oil stream leaving the pump rotor 3 at the absolute velocity $c_{2p}$ is decelerated channel 5 according to the theorem of momentum and is then deflected for re-entry into the turbine impeller 6, in which the oil stream regains the absolute entrance velocity $c_{1G}$ of the turbine wheel. From the variations of the circumferential components and of the circumferential speeds, there results the energy transmitted by the pump rotor to the oil stream.

The shaft seal 21 designed in the known manner prevents oil from flowing directly out of the deflection channel 5 into the space between the turbine impeller and the turbine wheel.

The sliding bearing 23 is formed as a radial bearing of known design, whereby the sliding ring 8 is guided radially. The quantity of oil supplied, less the leakage oil through the seal rings 9 and 10 and possibly oil discharged in the by-pass flows out through the annular gap 17, which is formed in known manner as a sealing gap and is dimensioned so that it can, without any great pressure losses, discharge the quantity of oil which for cooling flows out of chamber 13 and possibly via the external connection 24 into the pump-turbine cycle. For further pressure reduction this seal ring is followed by a float ring 19 of known design, to which is supplied the sealing oil from chamber 18. Via the float ring 19 to the oil enters the space 20 which communicates with the oil drain.

The packing ring 14 fixed to the housing may also be formed differently. Instead of the cover or bellows 14a there may be provided e.g. a bushing guided in an O ring and pre-stressed by extension or compression springs.

While a specific embodiment of the invention has been shown and described in detail to illustrate the application of the principles of the invention, it will be understood that the invention may be embodied otherwise without departing from such principles.

What is claimed is:

1. A fluid-locked shaft seal, comprising a housing, a rotating shaft in said housing, a seal ring in said housing affixed to said shaft for rotation therewith, a packing ring disposed in said housing around said shaft and fixed radially in respect to said shaft, flexible means connected between said packing ring and said housing permitting flexible axial movement of said packing ring relative to said housing, a slide ring in said housing around said shaft between said seal ring and said packing and connected to said shaft for rotation at substantially half the speed of rotation of said shaft, a pump rotor formed with said seal ring disposed on its side adjacent said slide ring generating a fluid flow, said housing and said seal ring and slide ring defining a deflection channel, a plurality of stationary impellers disposed in said deflection channel, wherein said slide ring has a turbine wheel disposed in said channel.

2. A fluid-locked shaft seal according to claim 1, including means defining a sealing shaft between the periphery of said seal ring and said housing.

3. A fluid-locked shaft according to claim 1, including a groove defined in said housing on the opposite side of said seal ring from said slide ring and a float ring disposed in said groove, said housing defining a sealing oil chamber between said float ring and said channel.

4. A fluid-locked shaft seal according to claim 1, including an annular gap defined between said seal ring and said housing.

5. A fluid-locked shaft seal according to claim 1, wherein said housing defines a sealing chamber adjacent said packing ring.

6. A fluid-locked shaft seal according to claim 1, including a sliding bearing carried by said housing between said slide ring and said housing.

* * * * *